United States Patent [19]
Sandri et al.

[11] Patent Number: 5,608,760
[45] Date of Patent: Mar. 4, 1997

[54] METHOD AND CIRCUITS FOR THE TRANSMISSION AND RECEPTION OF NUMERIC SIGNALS, IN WHICH THE PEAK POWER OF THE FILTERED SIGNAL TRANSMITTED IS REDUCED, COMPATIBLE WITH CONVENTIONAL CODING TECHNIQUES

[75] Inventors: Andrea Sandri, Monza; Arnaldo Spalvieri; Franco Guglielmi, both of Milan, all of Italy

[73] Assignee: Alcatel Italia SpA, Milan, Italy

[21] Appl. No.: 506,929

[22] Filed: Jul. 26, 1995

[30] Foreign Application Priority Data

Jul. 28, 1994 [IT] Italy ................................ MI94A1626

[51] Int. Cl.$^6$ ........................................................ H04B 15/00
[52] U.S. Cl. ............................ 375/285; 375/350; 375/261; 371/44; 329/304
[58] Field of Search .................................... 375/242, 240, 375/287, 241, 285, 350, 261, 262, 263, 264, 349, 340, 346, 324, 243, 265, 284, 296, 297, 348; 371/43, 44, 45; 329/304, 306; 341/4, 138; 370/19, 20, 109

[56] References Cited

U.S. PATENT DOCUMENTS

| | | | |
|---|---|---|---|
| 4,959,842 | 9/1990 | Forney, Jr. ................................ | 375/261 |
| 5,159,610 | 10/1992 | Eyuboglu et al. ........................ | 375/290 |
| 5,162,812 | 11/1992 | Aman et al. ................................ | 375/265 |
| 5,493,587 | 2/1996 | Sandri et al. ............................. | 375/285 |

FOREIGN PATENT DOCUMENTS

| | | |
|---|---|---|
| 0584534 | 3/1994 | European Pat. Off. . |
| 9217971 | 10/1992 | WIPO . |

OTHER PUBLICATIONS

"Advanced Modulaton Techniques for V.Fast", M. Eyuboglu et al, *European Transactions on Telecommunications*, vol. 4, No. 3, May–Jun. 1993, pp. 243–256.

"Trellis Shaping", G. Forney, Jr., *IEEE Transactions on Information Theory*, vol. 38, No. 2, Mar. 1992, pp. 281–300.

"Finite–State Modulation Codes for Data Storage", B. Marcus et al, *IEEE Journal on Selected Areas in Communications*, vol. 10, No. 1, Jan. 1992, pp. 5–37.

"Trellis–Coded Modulation with Redundant Signal Sets, Parts I and II", G. Ungerboeck, *IEEE Communications Magazine*, Feb. 1987, vol. 25, No. 2, pp. 5–21.

"A Stepped Square 256QAM for Digital Radio System", T. Ryu et al, *IEEE International Conference on Communications '86*, Toronto, Canada, Jun. 22–25, 1986, vol. 3, pp. 1477–1481.

"A New Multilevel Coding Method Using Error–Correcting Codes", H. Imai et al, *Transactions on Information Theory*, vol. IT23, No. 3 (1977), pp. 371–377.

"Analysis and Predistortion, Equalization, and ISI Cancellation Techniques in Digital Radio Systems with Nonlinear Transmit Amplifiers", G. Karam et al, *IEEE Transactions on Communications*, vol. 37, No. 12, Dec. 1989, pp. 1245–1253.

*Primary Examiner*—Wellington Chin
*Assistant Examiner*—William Luther
*Attorney, Agent, or Firm*—Ware, Fressola, Van Der Sluys & Adolphson

[57] ABSTRACT

Efficiency of a digital link, e.g., a microwave link, is improved by coding numeric signals for transmission so as to transmit selected sequences, in terms of peak power of a filtered signal, for transmission through the link. The most favorable numeric sequences may be encoded by baseband numeric coding.

11 Claims, 2 Drawing Sheets

5,608,760

METHOD AND CIRCUITS FOR THE TRANSMISSION AND RECEPTION OF NUMERIC SIGNALS, IN WHICH THE PEAK POWER OF THE FILTERED SIGNAL TRANSMITTED IS REDUCED, COMPATIBLE WITH CONVENTIONAL CODING TECHNIQUES

CROSS-REFERENCES TO RELATED APPLICATIONS

This application is related to commonly owned U.S. Pat. No. 5,493,587.

FIELD OF THE INVENTION

The present invention concerns a method and a system for the transmission and reception of numeric signals. In particular, it is used for improving the efficiency of a digital link, e.g. a microwave one.

BACKGROUND OF THE INVENTION

For using the available band in an effective manner, digital transmission systems may make use of multilevel modulation techniques. The system threshold with respect to thermal noise increases with increasing spectral efficiency and, in order to obtain a desired Bit Error Rate (hereinafter BER), greater values of the transmitted power are necessary. Such power is limited by the input-output characteristic of the transmitter final amplifier which is here structured as a nonlinear channel without storage.

When solid state amplifiers are used and/or when predistortion techniques without storage are utilized (see, e.g., G. Karam and H. Sari, "Analysis of predistortion, equalization and ISI cancellation techniques in digital radio systems with nonlinear transmit amplifiers", IEEE Transactions on Communications, vol. 37, No. 12, Dec. 1989), the input-output characteristic of the nonlinear channel (comprising in it also the effect of the amplifiers and of eventual predistortions) in practice is that of a hard limiter.

If a distortion-free transmission is desired, the peak of the complex envelope of the signal at the input of the nonlinear channel defined above must not go beyond the saturation point. The basic technique (see, e.g., T. Ryu, J. Uchibori and Y. Yoshida, "A stepped-square 256-QAM for digital radio systems", ICC '86, vol. 3, pages 1477–1481, June 1986) being used in order to avoid great values of the peak power, is to design the two-dimension constellation (hereinafter 2D) in such a way that the peak power of the unfiltered signal is as small as possible still observing the two restrictions of the assigned rate and of the minimum distance between the points of the transmitted constellation.

An alternative approach (still observing the two restrictions mentioned above) is disclosed in the European Patent Application EP93111722, filed by the applicant, titled "Method and Apparatus for reducing the peak power of data sequences", inventors A. Sandri and A. Spalvieri, where it is emphasized that, to improve the efficiency of a digital link (e.g., a microwave one), it is useful to focus on the peak power of the filtered signal transmitted. The aforementioned European patent Application has a U.S. counterpart, i.e., U.S. Pat. No. 5,493,587, claiming priority from the same parent, i.e., Italian application MI 92A001819, filed Jul. 27, 1992.

In order to reduce such power, in the above mentioned patent application, A. Sandri and A. Spalvieri propose to use, in transmission, an encoder disposed between the modulator and the transmit filter, and, in reception, a decoder disposed between the receive adapted filter and the demodulator.

SUMMARY OF THE INVENTION

It is an object of the present invention to provide a method and a coding system that, on the same terms, reduce the peak power of the filtered signal present at the input of the transmitter power amplifier.

It has been found, inter alia, that such a reduction is to advantage for radio relay links since it allows, for instance, the use of smaller antennas or the transmission over longer links.

According to the present invention, a method for transmission and reception of numeric signals comprises the steps of modulating source data from a numeric source for the transmission of the numeric signals through a transmit channel, by associating data groups with points of a two-dimension or n-dimension constellation for providing a modulated signal for said transmission of numeric signals through a transmit channel, filtering the modulated signal for providing a filtered signal, transmitting the filtered signal through the transmit channel, filtering the modulated signal for providing a filtered signal, transmitting the filtered signal through the transmit channel which is a nonlinear channel, where the nonlinearity is due to a nonlinear characteristic of a final amplifier of a transmitter, or to a nonlinear behavior of the transmit channel itself, or to both, for providing an outgoing signal from the transmit channel, receiving the outgoing signal from the transmit channel for providing a received signal, filtering and demodulating the received signal for resconstructing the source data, further comprising the step of coding said numeric signals prior to said step of transmitting so as to transmit selected sequences, in terms of peak power of the filtered signal, for transmission through the transmit channel.

In further accord with the method of the present invention, the selected numeric sequences are selected in terms of the peak power of the filtered signal, and such selection is carried out through a baseband numeric coding step.

In still further accord with the method of the present invention, the coding step is carried out by considering numeric sequences c having finite length, calculating a weight relative to each sequence, said weight being computed as a highest peak in a complex envelope of the filtered signal that every sequence c is capable of generating when a relative time position thereof is varied with respect to an impulse response of a transmission filter used for carrying out the step of filtering, arraying the sequences according to the weight calculated, eliminating sequences having greater weight, repeating the eliminating step an arbitrary number of times, provided that a resulting transmit capability of a system to carry out the method satisfies a transmission rate constraint thereof.

Still further in accord with the present invention, the coding step further comprises the step of grouping the points of the constellation according to homogeneous groups, e.g., by modulus and phase, so as to reduce the number of states, the length of the code being equal.

According still further to the method of the present invention, the modulating step may be of the quadrature amplitude modulation (QAM) type or the phase shift keying (PSK) type.

In still further accord with the method of the present invention, the coding of said sequences is carried out through a conventional encoder for increasing a minimum distance between the sequences of transmitted points, other conditions being equal.

Further in accord with the method of the present invention, the steps of coding through a conventional encoder and decoding thereof operate in a manner independent from the other steps.

Still further in accord with the method of the present invention, the coding for reducing the peak power of the filtered signal operates on uncoded bits for increasing the minimum distance between the sequences of the transmitted points, other conditions being equal.

On the other hand, a system for carrying out the method of the present invention comprises, for transmission, a data source, an encoder, a modulator, a transmission filter and a nonlinearity; and for reception, a filter, a decoder and a demodulator, wherein for the transmission, the encoder for transmission of the sequences selected in terms of the peak power of the filtered signal is inserted in a baseband portion of the system, between the data source and upstream of the transmission filter.

In further accord with the system of the present invention, it further comprises an encoder for coding the sequences through a conventional encoder designed for increasing a minimum distance between the sequences of transmitted points.

In still further accord with the system of the present invention, the conventional encoder operates for carrying out the coding step in a manner independent from the means for carrying out the other steps.

This invention provides an improvement over the above-mentioned patent application characterized by:
- a different and more efficient code construction, since it allows the peak value of the coded signal envelope to be further decreased while observing the above-mentioned constraints on the rate and on the minimum distance between the points of the transmitted constellation;
- a different arrangement of the encoder in transmission and of the decoder in reception, which allows the coding for the reduction of the filtered signal peak power to be effectively integrated with other conventional coding techniques for the increasing of the minimum distance between the sequences of transmitted points (e.g., of type Trellis Code Modulation, or of type Multi Level Code Modulation, see H. Imas and S. Hirakawa, "A new multilvel coding method using error correcting codes", IEEE Trans. on Inform. Th., vol. IT-23, pp 371–377, 1977 and G. Ungerboeck, "Trellis coded modulation with redundant signal sets", IEEE Communication Magazine, vol. 25, No. 2, Feb. 1987, for a description of such conventional coding techniques). In the absence of such compatibility it is possible to introduce only one of the two techniques mentioned above into the transmission system, and therefore realize only one of the two gains. In the case of the present invention, on the contrary, it is possible to introduce the two types of coding at the same time and obtain the sum of the gains relative to the individual codings as the overall gain.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
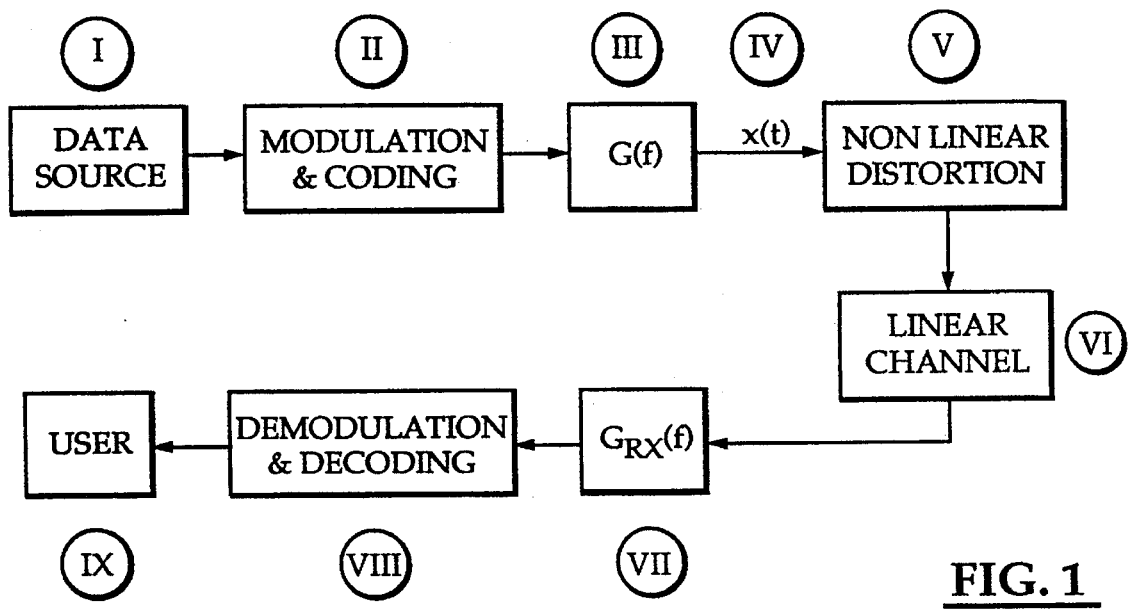
FIG. 1 shows the schematic block diagram of a generic digital transmission system.

FIG. 1 depicts the schematic block diagram of a generic digital transmission system; in this figure there are illustrated:

a data source I (labelled DATA SOURCE) for outputting the numeric sequence to be transmitted:

a block II (labelled MODULATION & CODING) that receives at its input the numeric sequence to be transmitted and performs conventional coding operations to increase the minimum distance between the sequences of transmitted points (e.g., convolutional Trellis Code Modulation or Multi Level codings) and of modulation, for outputting one of the points of the constellation to be transmitted. Inside this block an encoder is provided for reducing the peak power of the filtered signal in accordance with the invention;

a transmission filter III (labelled G(f)) for outputting an analog signal IV labelled x(t) to be transmitted;

a block V (labelled NONLINEAR DISTORTION) representing an undesired non linear distortion on the signal path and operating on the signal labelled x(t). It may be due to the nonlinear characteristic of the transmitter final amplifier (eventually accompanied with predistortion techniques) or, more generally, to a nonlinear behaviour of the transmission channel;

a transmission channel proper VI (labelled LINEAR CHANNEL) outputting a signal formed by the signal at its input summed and/or combined with disturbances of various kinds;

a receive filter VII (labelled $G_{RX}(f)$) receiving for the signal from the transmission channel and for providing a suitable filtering;

a block VIII (labelled DEMODULATION & DECODING) that receives at its input the filtered signal, demodulates it and carries out decoding operations relative to the conventional codings mentioned above. Inside this block, a decoder for reducing the peak power in accordance with the invention is inserted;

a user IX (labelled USER) for receiving the numeric sequence from the block XIII. In an advantageous and therefore preferred embodiment, the encoder for reducing the peak power of the filtered signal x(t) is designed and implemented as set forth hereinafter.

Peak power of the encoded and filtered signal

This section is devoted to evaluation of an overestimation (hereinafter: "upper bound") of the peak power of an encoded and filtered signal. This bound will be useful both for the construction of the code and for the evaluation of its features. The code to which we are interested has an infinite length. Let M be the code and M= ..., m(−1), m(0), m(1), ... ; m(i) E S, be a codeword of M. The alphabet S of the code is a constellation 2D, whose points $(s_1, s_2, \ldots, S_s)$ are represented by complex numbers. The complex envelope at the output of the filter when m is presented at its input is:

$$x(t) = m \otimes g(t) = \sum_{i=-\infty}^{\infty} m(i)g(t-iT), \quad (1)$$

where g(t) is the impulse response of the transmission filter, T is the symbol interval and $\otimes$ is the convolution operator. The peak power of x(t) is:

$$P_p(x) = \max_{-\infty \leq t \leq \infty} \{|x(t)|^2\}. \quad (2)$$

Assume that every version, shifted in time by integer multiples of T seconds, of a codeword is still a codeword. Under this assumption, the filtered signal x(t) is a cyclostationary process having period T. Since the period is T, eq. (2) is equivalent to:

$$P_p(M) = \max_{m \in M} \max_{\tau \leq t < \tau+T} \{|m \otimes g(t)|^2\}. \quad (3)$$

Parameter $\tau$ is a time reference and can be arbitrarily fixed. Note that the evaluation of (3) is, in practice, not feasible until the code is truncated. Let n be the length of the truncated code, and C the truncated version of M. C is the union of all the n-tuples of labels of the codewords belonging to M.

The codewords of C are denoted by $c=c(1), c(2), \ldots, c(n)$, c(i) belonging to S. The following upper bound on the peak power of M applies:

$$P_p(M) \leq \left( w(S) + \max_{c \in C} \{w(c)\} \right)^2 \quad (4)$$

where $$w(c) = \max_{\tau \leq t < \tau+T} \{|c \otimes g(t)|\}, \quad (5)$$

and $$w(S) = \max_{\tau \leq t < \tau+T} \left\{ \left( \sum_{i=-\infty}^{0} |g(t-iT)| + \sum_{i=n+1}^{\infty} |g(t-iT)| \right) \right\} * \max_{s \in S} \{|s|\}. \quad (6)$$

The weight of w(c) takes into account the effect of the codeword C on the instantaneous power of x(t) in the observation interval $(\tau, \tau+T)$, while the weight w(S) is an upper bound on the effect of the worse pair of queues. If a filter, physically realizable, is considered, the sums of the first term in eq. (6) converge to a finite value and therefore, in practice, they can be truncated. Since the upper bound (4) depends on $\tau$, the $\tau$ leading to the minimum upper bound could be pursued.

This procedure is long and of very poor help in reaching the main goal which is the code construction.

The following $\bar{\tau}$ leads to an upper bound which is often very close to the minimum upper bound $$\bar{\tau} \leftarrow \max_{-\infty \leq \tau \leq \infty} \left\{ \int_{\tau-nT}^{\tau} |g(t)|^2 dt \right\}. \quad (7)$$

The $\bar{\tau}$ indicated above is such that the maximum possible of energy of the pulse g(t) is in the interval $(\bar{\tau}-nT, \bar{\tau})$. When the waveform at the output of the filter is observed in the interval $(\bar{\tau}, \bar{\tau}+T)$, the truncated codeword c covers the interval $(\bar{\tau}-nT, \bar{\tau})$. If the interval $(\bar{\tau}-nt, \bar{\tau})$ contains most of the energy of g(t), then the weight (6) is negligible with respect to weight (5), and therefore the choice $\tau=\bar{\tau}$ leads to a value of (4) very close to the true peak power (3).

To be noted expressly that equations (5) and (7) have been chosen according to an advantageous embodiment of the invention; they are susceptible of all those modifications and variations which, being apparent to those skilled in the art, are not described here.

Lastly, equation (5) with $\tau=\bar{\tau}$ represents the "weight" of the codeword c. This weight is computed as the highest peak in the complex envelope of the filtered signal x(t) that codeword c can generate when its relative time position with respect to the impulse response of the filter g(t) is varied. The weight w(c) is then interpreted in the following manner: the greater such weight, the worse the effect of codeword c on the peak power of the filtered signal x(t) will be.

Construction of the code

Let b/T be the constraint on the rate expressed in bits/second i.e., let b denote the information bits to be transmitted every symbol interval T. Let S be the number of points of the constellation and let $eq_2 S > b$, i.e. the number of points of the constellation is greater than the one strictly necessary to the transmission of the b bits for each symbol interval T.

The idea underlying the code construction is very simple and can be summarized as follows. Consider the universe code of infinite length, i.e. the set of all sequences of points from S. In the first step, all the sequences containing the n-tuples of higher weight w(c) are discarded. In the second step, the sequences containing the n-tuples of higher weight are discarded from the code obtained in the first step, and so on. In this manner, the upper bound (4) on the peak power is decreased at each step. The discarding process can be continued until the code satisfies the rate constraint. In the limit, when the interval $(\bar{\tau}-nt, \bar{\tau})$ contains all the energy of g(t), the upper bound (4) equalizes the peak power and the discarding process ends with the code having the minimum peak power for the given initial constellation.

The check whether the code, at the k-th discarding step, satisfies or less the rate constraint, is feasible through known graph theory techniques (see, e.g., B. H. Marcu, P. H. Siegel and J. K. Wolf, "Finite-state modulation codes for data storage", IEEE ISAC, vol. 10, No. 1 pp 5–37, Jan. 1992). Such techniques have been developed for realizing devices for recording data on magnetic support and, in the present invention, they are applied for the first time, to the multilevel numeric modulations. Hence, the construction of the code is formulated again in terms of graphs.

The universe code is here represented by a graph $A^{(0)}$, consisting of $S^{n-1}$ states and S transitions that start from and converge in each state. Each state corresponds to a (n-1)-tuple of points of the constellation. The state $a=(a(1), a(2), \ldots, a(n-1))$, $a(i) \in S$, is reached by the set of states $(s,a(1), \ldots, a(n-2))$, and starting from a it is possible to reach the set of states $(a(2), a(3), \ldots, s)$. The weight w(c) is the label of the transition starting from state $(c(1), c(2), \ldots, c(n-1))$ and ending in the state $(c(2), c(3), \ldots, c(n))$. To discard the sequences containing the n-tuple of higher weight, the transition of higher weight is to be simply discarded from the graph.

The constraint on the rate is introduced by computing the capacity of the graph as described in the above-mentioned article by B. H. Marcus et al.

Let $A^{(k)}$ be the graph after the k-th step in the construction of the code. The discard process stops at $k=\bar{k}$ such that Cap $(A^{(K)}) \geq b$ and Cap $(A^{(K+1)}) < b$.

Note expressly that the use of the strategy set forth above allows the realization of codes that are more efficient than those proposed in the above-mentioned patent application, inventors A. Sandri and A. Spalvieri, since it allows—other conditions being equal—to discard a greater number of sequences of symbols, thus obtaining a further reduction of the peak power of the filter signal x(t) present at the input of the nonlinear portion of the transmitter.

Once the graph describing the code has been defined as set forth above, it is possible to realize, by following mechanically known techniques disclosed in the above-mentioned article by B. H. Marcus et al., the encoder and the decoder to be inserted respectively in the transmitter and in the receiver. Such a procedure, in view of this article and of the foregoing description, is apparent to those skilled in the art and therefore it will be omitted for conciseness.

Sub-optimal codes

One way for reducing the design time and the complexity of the resulting encoder/decoder is to reduce the number of states of the initial graph.

To this end, points from S can be grouped according to homogeneous groups. The term "homogeneous points" is used herein to indicate those points of the constellation having similar values of modulus and phase which therefore make a contribution about equal to the weight w(c). Let G be the number of such groups. Now the universe code is described by a graph consisting of $G^{n-1}$ states and G groups of parallel transitions diverging from, and converging in, each state. Every group of parallel transitions is viewed as a unique entity whose label (weight) is the weight of the worse transition in the group (i.e. the higher weight among those associated with the transitions in the group). At each step of the code construction the group of transition having the worst weight is discarded.

The idea underlying this discard-by-groups operation is that homogeneous groups of points of the constellation affect almost in the same way the peak power of the filtered signal, and therefore can be discarded or kept together.

Compatibility with coded modulations

Consider the case in which the constellation is partitioned into $2^{b_c}$ subsets, and some code constraint is imposed on the sequences of subsets, while $b_u$ bits are left uncoded as often happens in conventional coded modulations devoted to the increasing of the minimum distance between the sequences of the transmitted points (see, e.g., the above-mentioned articles of H. Imai and S. Hirakawa and of G. Ungerboeck). In order for a peak reduction coding to be possible, the number of points in S must be greater than $2^{(b_c+b_u)}$. Compatibility of the peak reduction code and the conventional coded modulation in this circumstance means that the two code sequences are coded (and decoded) in an independent manner one from another. This means that the peak reduction coding must concern the uncoded bits $b_u$ only. One way to do this is to group the points of the constellation in such a way that each group contains the same number of points from each subset. The construction of the code then goes on in the same way set forth in the sub-optimal codes section, the constraint on the rate being now $(b_c+b_u)/T$.

Figure 2:
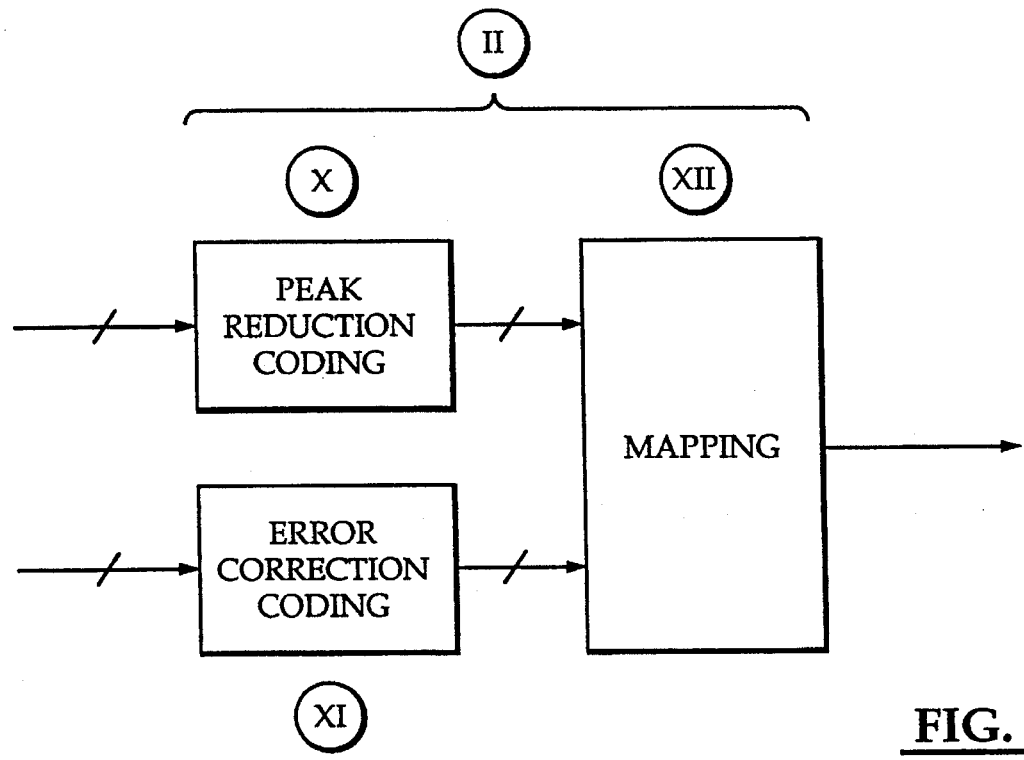
FIG. 2 illustrates a possible embodiment of an encoder for the reduction of the peak power of a filtered signal.
Figure 3:
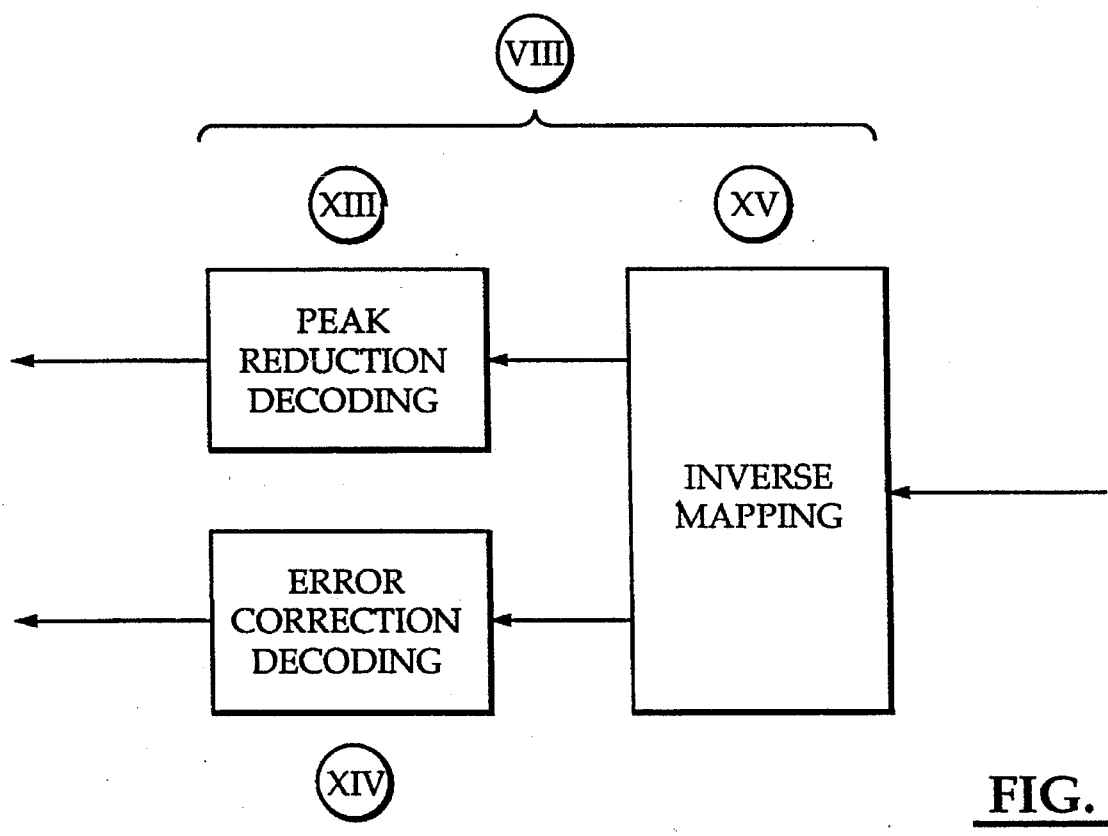
FIG. 3 illustrates a possible embodiment of a decoder of the invention.

In an advantageous and, therefore, preferred embodiment, the peak reduction encoder is inserted inside block II of FIG. 1, in the manner shown in FIG. 2. Similarly, the decoder is inserted inside block VIII of FIG. 1, in the manner shown in FIG. 3. In the following description, the blocks VIII, XIV and XV of FIG. 3 correspond to the blocks X, XI and XII of FIG. 2, and perform decoding as opposed to coding, as described herein. In FIG. 2 there are:

a block XI (labelled ERROR CORRECTION CODING) that receives at its input the bits relative to the choice of the subset and imposes on them a suitable conventional coding constraint (e.g., on the type Trellis Code Modulation or Multi Level Code Modulation) devoted to the increasing of the minimum distance between the sequences of the transmitted points;

a block X (labelled PEAK REDUCTION CODING) along with the relative decoder in accordance with the invention that receives at its input the "uncoded" bits of the conventional coding and imposes on them a suitable coding constraint devoted to the peak power reduction, on the basis of what set forth in the previous sections (code construction and sub-optimal codes);

a block XII (labelled MAPPING) providing at its output the symbol to be transmitted.

Some considerations about feature evaluation

The features of a coded signal, transmitted on a channel with white gaussian additional noise under the peak power constraint, is expressed by the ratio $$PDR = P_p(M)/\delta_{min}^2,$$

where $\delta_{min}^2$ is the minimum Euclidean square distance between any two points of the constellation at the decision element, and $g(t_0-t)$ is assumed to be the impulse response of the receive filter. Note that the proposed code construction does not optimize the PDR, since it does not take into account the term $\delta_{min}^2$.

Therefore, we cannot guarantee an optimum in terms of PDR, not even for $n \rightarrow \infty$.

As usual, the coding gain is the ratio between the PDR of a reference uncoded signal and the PDR reached by the coded one under the same rate constraint. This coding gain is interpreted as the increase of the signal-to-noise ratio at the decision element of a receiver with a filter adapted for a fixed value of the peak power at the input of the nonlinear channel defined above.

Decoder

The decoder (to be inserted in block VIII of FIG. 1, as said) can be defined starting from what has been set forth and defined in the foregoing sections, according to known rules, set forth in the above-mentioned article by B. H. Marcus et al. A detailed description thereof in the form of a block diagram is not given here (being apparent to those skilled in the art in the light of what described hereinbefore.

Although the invention has been shown and described with respect to a best mode embodiment thereof, it should be understood by those skilled in the art that the foregoing and various other changes, omissions and additions in the form and detail thereof may be made therein without departing form the spirit and scope of the invention.

What is claimed is:

1. Method for transmission and reception of numeric signals comprising the steps of:

modulating numeric signals from a numeric source by associating data groups with points of a two-dimension or N-dimension constellation for providing a modulated signal for said transmission of numeric signals through a transmit channel;

filtering the modulated signal for providing a filtered signal;

transmitting the filtered signal through the transmit channel which is a nonlinear channel, where the nonlinearity is due to a nonlinear characteristic of a final amplifier of a transmitter, or to a nonlinear behavior of the transmit channel itself, for providing an outgoing signal;

receiving the outgoing signal from the transmit channel for providing a received signal;

filtering the received signal for providing a filtered received signal;

demodulating the filtered received signal for reconstructing the numeric signals;

wherein said step of modulating includes, as a baseband numeric coding step, the step of coding said numeric signals and so creating a code governing encoding and decoding of said numeric signals, so as to provide sequences that are favorable in terms of peak power of the filtered signal, and wherein said step of demodulating includes, as a baseband numeric decoding step, using said code for decoding said filtered received signal for reconstructing the numeric signals.

2. Method according to claim 1, characterized in that said step of coding is carried out in accordance with the following steps:

considering sequences c having finite length;

calculating a weight w(c) relative to each said sequence, said weight being computed as a highest peak in a complex envelope of the filtered signal that every said sequence c is capable of generating when a relative time position thereof is varied with respect to an impulse response occurring during said step of filtering the modulated signal;

arraying said sequences according to said weight calculated;

eliminating any of said sequences having greater weight;

repeating said eliminating step an arbitrary number of times, provided that a resulting transmit capability of a system for carrying out the method satisfies a transmission rate constraint thereof.

3. Method according to claim 2, characterized in that the coding further comprises the step of grouping the points of the constellation, each point corresponding to one of a number of states used in a graph describing the code governing encoding and decoding of the numeric signals, according to homogeneous groups so as to reduce the number of states, the length of the code being equal.

4. Method according to claim 2, characterized in that the weight w(c) is given by $$w(c) = \max_{\bar{\tau} \leq t < \bar{\tau}+T} \{|c \otimes g(t)|\}, \quad (8)$$

in which the maximum is found by varying only the time t, and where $$\bar{\tau} \leftarrow \max_{-\infty \leq \tau \leq \infty} \left\{ \int_{\tau-nT}^{\tau} |g(t)|^2 dt \right\} \quad (9)$$

in which the maximum if found by varying only the time $\tau$, and in which c represents a finite-length sequence, the symbol $\otimes$ represents performing a convolution operation, g(t) represents how the transmission filter responds to an impulse, and T represents how much time passes between transmitting one element of the finite-length sequence and the next.

5. Method according to claim 1, characterized in that said modulating is of type quadrature amplitude modulation (QAM) or of type phase shift keying (PSK).

6. Method according to claim 1, further comprising the step of conventionally coding said sequences using conventional coding methods for increasing a minimum distance between the sequences of transmitted points, and the step of decoding said conventionally coded sequences.

7. Method according to claim 6, characterized in that said steps of conventionally coding said sequences and decoding said conventionally coded sequences operate in a manner independent from the other steps of the method.

8. Method according to claim 7, characterized in that the step of coding operates on only bits that are not coded during said step of conventionally coding.

9. System for transmitting and receiving through a transmit channel numeric signals from a numeric source, the system comprising:

a transmission section having interconnected transmission components, including: a data source for providing numeric signals, an encoder, a modulator for providing modulated source data by associating data groups with points of a two-dimension of N-dimension constellation, a transmission filter for providing a filtered signal, and a source of nonlinearity, and;

a receiver section having interconnected receiver components, including: a receiver filter, a decoder and a demodulator, characterized in that the encoder encodes the numeric signals so as to provide sequences that are favorable in terms of peak power of the filtered signal, and is inserted in a baseband portion of the system, between the data source and the transmission filter.

10. System according to claim 9, further comprising a conventional encoder that encodes said sequences to increase the minimum Euclidean distance between the sequences of transmitted points.

11. System according to claim 10, characterized in that said conventional encoder performs its encoding independent of the other components of the system.

* * * * *

UNITED STATES PATENT AND TRADEMARK OFFICE
CERTIFICATE OF CORRECTION

PATENT NO. : 5,608,760
DATED : March 4, 1997
INVENTOR(S) : Sandri et al

It is certified that error appears in the above-indentified patent and that said Letters Patent is hereby corrected as shown below:

At column 3, line 50, please cancel "multilvel" and substitute therefor --multilevel--.

At column 4, line 63, please cancel "and M=" and substitute therefor --and m=--; and At column 4, line 65, please cancel "$(s_1, s_2, ..., S_s)$" and substitute therefor --$(s_1, s_2, ..., s_s)$--.

At column 6, line 64, please cancel "k=k" and substitute therefor --k=K--.

At column 10, line 31 (line 8 of claim 9), please cancel "of" between "two-dimension" and "N-dimension", and substitute --or-- therefor.

Signed and Sealed this

Sixteenth Day of September, 1997

Attest:

BRUCE LEHMAN

Attesting Officer

Commissioner of Patents and Trademarks